(12) United States Patent
Sorbel

(10) Patent No.: US 11,150,135 B1
(45) Date of Patent: Oct. 19, 2021

(54) ADVANCED PHOTONIC BIDIRECTIONAL REFLECTANCE DISTRIBUTION FUNCTION MEASUREMENT DEVICE

(71) Applicant: Raytheon Company, Waltham, MA (US)

(72) Inventor: Scott Sorbel, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/922,102

(22) Filed: Jul. 7, 2020

(51) Int. Cl.
*G01J 3/50* (2006.01)
*G01J 3/28* (2006.01)
*G01N 21/47* (2006.01)

(52) U.S. Cl.
CPC ............. *G01J 3/50* (2013.01); *G01J 3/2823* (2013.01); *G01N 21/4795* (2013.01)

(58) Field of Classification Search
CPC ...... G01J 3/50; G01J 3/2823; G01N 21/4795; G02B 1/002; G02F 2202/30
See application file for complete search history.

(56) References Cited

U.S. PATENT DOCUMENTS

| | | | | |
|---|---|---|---|---|
| 5,292,483 A | * | 3/1994 | Kaye | G01J 1/04 250/458.1 |
| 10,041,833 B1 | * | 8/2018 | Chirayath | G01J 3/108 |
| 10,122,062 B1 | | 11/2018 | Sorbel | |
| 2016/0040985 A1 | * | 2/2016 | Nagai | G01N 21/8422 356/328 |
| 2018/0209909 A1 | * | 7/2018 | Jian | G01N 21/658 |
| 2019/0101444 A1 | * | 4/2019 | Yoon | G01J 3/2803 |
| 2019/0178714 A1 | * | 6/2019 | Faraji-Dana | G02B 5/1847 |
| 2020/0025610 A1 | * | 1/2020 | Chandrasekar | G01J 3/0237 |
| 2020/0348176 A1 | * | 11/2020 | Faraji-Dana | G01J 3/1804 |

OTHER PUBLICATIONS

Hu et al. "Rainbow Trapping in Hyperbolic Metamaterial Waveguide." CLEO: 2013, Lasers and Electro-Optics (CLEO), 2013 Conference on, Jun. 2013, pp. 1-2.

Abutahoun et al. "A crescent shaped split ring resonator to form a new metamaterial"; International Journal of Engineering and Technology 2.10; 2012.

(Continued)

*Primary Examiner* — Dominic J Bologna
(74) *Attorney, Agent, or Firm* — Renner, Otto, Boisselle & Sklar, LLP

(57) ABSTRACT

A bidirectional reflectance distribution function (BRDF) measurement system is provided that measures the BRDF across many photonic bands such as the UV, Vis, NIR, SWIR, MWIR, and LWIR (scale) simultaneously (speed) in an innovative measurement system. The measurement system includes an illuminating optical system, a detection system, and a calibration reference. The illuminating optical system directs illuminating light to an imaging location and the detection system detects returning light from the imaging location. The calibration reference including an optical metamaterial having a receiving surface. The calibration reference is placed at the imaging location and alters illuminating light incident on the receiving surface to produce returning light having known optical properties.

18 Claims, 8 Drawing Sheets

(56) References Cited

OTHER PUBLICATIONS

Atre et al. "Metamaterials: A Broadband Negative Index Metamaterial at Optical Frequencies (Advanced Optical Materials Apr. 2013)." Advanced Optical Materials, vol. 1, No. 4, pp. 350-350.

Cheng et al.; "Perfect Metamaterial Absorber Based on a Split-Ring-Cross Resonator"; Applied Physics A: Materials Science & Processing, vol. 102, No. 1, Jan. 2011; pp. 99-103.

Ding, F. et al.; Ultra-broadband microwave metamaterial absorber; Applied Physics Letters, 100 (10), 2012.

Gong et al. "High-Q Resonators and Filters inside Advanced Low-Temperature Co-Fired Ceramic Substrates Using Fine-Scale Periodicity." IEEE Transactions on Microwave Theory and Techniques, vol. 56, No. 4, pp. 922-930.

Landy et al.; "Perfect metamaterial absorber." Physical review letters 100.20; 2008.

Marques et al.; "Left-Handed-Media Simulation and Transmission of EM Waves in Subwavelength Split-Ring-Resonator-Loaded Metallic Waveguides"; Physical Review Letters, vol. 89, No. 18.

Palma et al.; "Acoustic metamaterials in aeronautics"; Applied Sciences 8.6; 2018.

Watts et al.; "Metamaterial electromagnetic wave absorbers (adv. mater. 23/2012)" Advanced Materials 24.23; 2012.

Yin, X. et al; Ultra-wideband microwave absorber by connecting multiple absorption bands of two different-sized hyperbolic metamaterial waveguide arrays; Sci Rep 5, 15367; 2015.

* cited by examiner

ADVANCED PHOTONIC BIDIRECTIONAL REFLECTANCE DISTRIBUTION FUNCTION MEASUREMENT DEVICE

FIELD OF INVENTION

The present disclosure relates generally to measuring the photonic response of materials and more particularly to measuring bidirectional reflectance distribution function (BRDF) in the photonic regime.

BACKGROUND

Advanced development of photonic materials allows one to control light at will with unprecedented spatial and specular performance. To measure the optical properties of such materials, different measurement systems can be used to measure the direct hemispherical reflectance (DHR) or bidirectional reflectance distribution function (BRDF) of the material. These measurement systems measure the angular performance of sample reflectivity that includes diffuse and specular components, but have difficulty finding very diffuse scattering standards.

SUMMARY

When measuring the optical properties of a material, there are diffuse and specular components of reflection properties. Typically separate specular and diffuse references are used to calibrate a given measurement system. Part of the reason for this is to enable the measurement system to capture the full gamut of spatial reflection properties by calibrating the system from extremely diffuse surfaces to highly polished reflective surfaces.

In a general embodiment, a measurement system utilizing metamaterials is provided that measures diffuse omnidirectional (and non-omnidirectional) scattering photonic (e.g. UV, Vis, NIR, SWIR, MWIR, LWIR, etc.) profiles regardless of incident angle in a bidirectional reflectance distribution function (BRDF) measurement system. This system is more angularly consistent than a traditional Lambertian source, regardless of incident angle.

In another general embodiment, the measurement system includes a parabolic reflector having an opening at the apex of the reflector. An optical system captures light exiting through a base of the parabolic reflector. Another optical system captures light exiting through the apex of the parabolic reflector that would otherwise have been blocked by the sample being measured.

According to one embodiment, a measurement system is provided. The measurement system includes an illuminating optical system, a detection system, and a calibration reference. The illuminating optical system is configured to direct illuminating light to an imaging location. The detection system is configured to detect returning light from the imaging location. The calibration reference includes an optical metamaterial having a receiving surface. The calibration reference is configured to both be placed at the imaging location and to alter illuminating light incident on the receiving surface to produce returning light having known optical properties.

Alternatively or additionally, the measurement system includes circuitry configured to receive an output signal from the detection system based on the detected returning light. The circuitry is also configured to determine a calibration function based on the output signal and the known optical properties.

Alternatively or additionally, the detection system includes an imager and a reflecting surface having a parabolic shape encircling the imaging location, the reflecting surface positioned to generate altered returning light by altering a trajectory of the returning light, such that the altered returning light exits at a base of the reflecting surface and is detected by the imager.

Alternatively or additionally, the detection system includes an output optical system having a mirror configured to generate further altered returning light by altering a trajectory of the altered returning light, such that the further altered returning light is detected by the imager. The illuminating light passes through an opening in the mirror before being redirected by the reflecting surface to illuminate the imaging location.

Alternatively or additionally, the parabolic shape of the receiving surface has an opening located directly above the imaging location at an apex of the reflecting surface. The output optical system includes an apex optical system configured to generate modified returning light by altering the trajectory of the returning light passing through the opening, such that the modified returning light is detected by the imager.

Alternatively or additionally, the measurement system also includes a light source configured to generate the illuminating light.

Alternatively or additionally, the known optical properties include a pattern of diffuse reflection independent of elevation and azimuthal angle of the incident light.

According to another embodiment, a measurement system is provided including an illuminating optical system and a detection system. The illuminating optical system is configured to direct illuminating light to an imaging location. The detection system is configured to detect returning light from the imaging location and includes a reflecting surface an output optical system, and an apex optical system. The reflecting surface has a parabolic shape encircling the imaging location and positioned to generate altered returning light by altering a trajectory of the returning light, such that the altered returning light exits at a base of the reflecting surface and is detected by an imager. The parabolic shape of the receiving surface has an opening located directly above the imaging location at an apex of the reflecting surface. The output optical system has a mirror configured to generate further altered returning light by altering a trajectory of the altered returning light, such that the further altered returning light is detected by the imager. The illuminating light passes through an opening in the mirror before being redirected by the reflecting surface to illuminate the imaging location. The apex optical system is configured to generate modified returning light by altering the trajectory of the returning light passing through the opening, such that the modified returning light is detected by the imager.

Alternatively or additionally, the measurement system also includes a calibration reference including an optical metamaterial having a receiving surface. The calibration reference is configured to both be placed at the imaging location and to alter illuminating light incident on the receiving surface to produce returning light having known optical properties.

Alternatively or additionally, the measurement system also include circuitry configured to: receive an output signal from the detection system based on the detected returning light from the calibration reference; and determine a calibration function based on the output signal and the known optical properties.

Alternatively or additionally, the measurement system further includes a light source configured to generate the illuminating light.

Alternatively or additionally, the known optical properties include a pattern of diffuse reflection independent of elevation and azimuthal angle of the incident light.

According to a further embodiment, a method for measuring a bidirectional reflectance distribution function (BRDF) is provided. The method includes positioning a calibration reference including an optical metamaterial having a receiving surface at an imaging location of a reflecting surface. The calibration reference is illuminated at the imaging location with illuminating light. The illuminating light incident on the receiving surface is altered using the calibration reference to produce calibrated returning light having known optical properties. The calibrated returning light is detected with a detection system. A calibration function is determined based on the calibrated returning light and the known optical properties.

Alternatively or additionally, the method also includes positioning a sample at the imaging location and illuminating the sample at the imaging location with the illuminating light. The illuminating light incident on the sample is altered using the sample to produce sample returning light. The returning sample light is detected with a detection system and a detection signal is output from the detection system. A calibrated sample light signal is generated by applying the calibration function to the detection signal.

Alternatively or additionally, the calibrated sample light signal is a BRDF of the sample. The method further includes outputting the BRDF of the sample.

Alternatively or additionally, the detecting of the returning light with the detection system includes generating altered returning light by altering a trajectory of the returning light using a reflective surface of the detection system having a parabolic shape encircling the imaging location, such that the altered returning light exits at a base of the reflecting surface is detected by an imager of the detection system.

Alternatively or additionally, the detecting of the returning light with the detection system further includes generating further altered returning light, using an output optical system of the detection system having a mirror, by altering a trajectory of the altered returning light, such that the further altered returning light is detected by the imager. The illuminating of the imaging location includes passing the illumination light through an opening in the mirror before redirecting the illuminating light with the reflecting surface to illuminate the imaging location.

Alternatively or additionally, the detecting of the returning light with the detection system further includes generating modified returning light by altering the trajectory of the returning light passing through an opening in the parabolic shape of the receiving surface located directly above the imaging location at an apex of the reflecting surface, such that the modified returning light is detected by the imager.

Alternatively or additionally, the illuminating of the imaging location includes generating the illuminating light with a light source.

Alternatively or additionally, the known optical properties include a pattern of diffuse reflection independent of elevation and azimuthal angle of the incident light.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
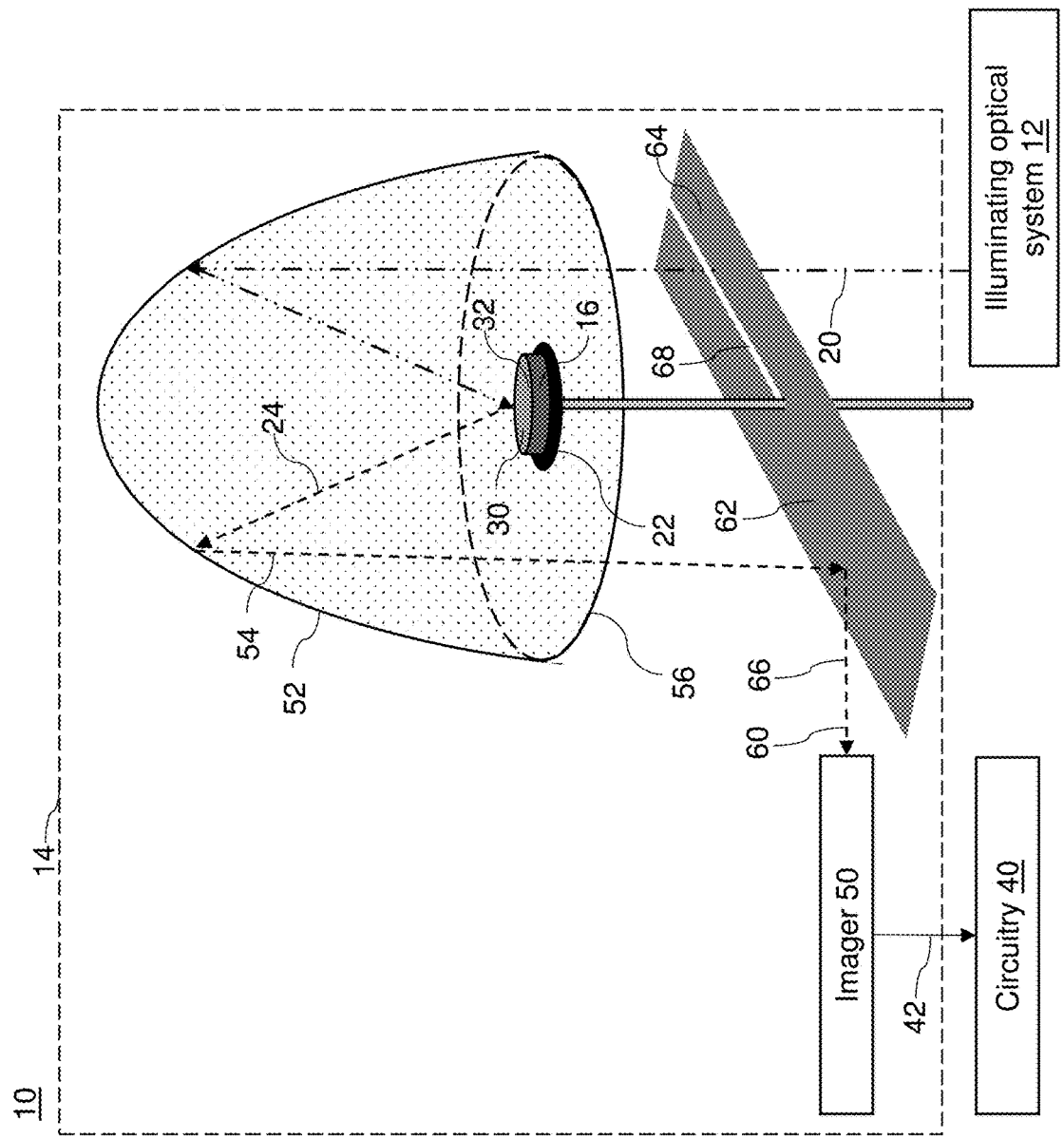
FIG. 1 is a schematic diagram of an exemplary measurement system.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The measurement system 10 and the calibration reference 16 described herein may be used to measure large photonic spectral bandwidth areas of samples in a full Bidirectional Reflectance Distribution Function (BRDF) or $2\pi$ measurement that was typically inaccessible due to limited diffuse reference samples that were limited to one plane (e.g. Directional Hemispherical Reflectance that provides reflection versus angle of incidence (AOI)) compared to the measurement system described herein (e.g. BRDF, full $2\pi$ steradians).

Turning to FIG. 1, in a general embodiment, a BRDF measurement system 10 is shown. The measurement system 10 includes an illuminating optical system 12, a detection system 14, and a calibration reference 16. The illuminating optical system 12 directs illuminating light 20 to an imaging location 22 and the detection system 14 detects returning light 24 from the imaging location 22. The calibration reference 16 includes an optical metamaterial 30 having a receiving surface 32. The calibration reference 16 is placed at the imaging location 22 and alters illuminating light 20 incident on the receiving surface 32 to produce returning light 24 having known optical properties.

As shown, the detection system 14 may include an imager 50 and a reflecting surface 52 having a parabolic shape encircling the imaging location 22. The reflecting surface 52 is positioned to generate altered returning light 54 by altering a trajectory of the returning light 24, such that the altered returning light 54 exits at a base 56 of the reflecting surface 52 and is detected by an imager (e.g., an array of imagers) 50. For example, the reflecting surface 52 collects and collimates light from the imaging location 22 and directs the collimated light, such that the collimated light is detected by the imager 50. The imager 50 outputs a signal based on the detected illumination 60.

The reflecting surface 52 may be made of any suitable material reflective to the illuminating light 20. For example, the reflecting surface 52 may be made of polished metal, such as diamond turned aluminum. The illuminating light 20 may be any wavelength of light and is not limited to visible electromagnetic radiation. For example, the illuminating light 20 may have a wavelength in the range of ultraviolet (UV) to infrared (IR). As is described in further detail below, the illuminating light 20 may be generated by one or more light sources.

To measure optical properties of a sample, the measurement system 10 should be calibrated to account for how the measurement system affects the signal 42 output by the imager 50. To calibrate the output signal 42 from the detection system 14, a sample having known optical properties may be placed into the measurement system 10 to calibrate the system. In an embodiment, the calibration reference 16 is used to calibrate the illuminating optical system 12 detection system 14. That is, the calibration reference 16 is used to account for the effects of the illuminating optical system 12 and the detection system 14 on the illuminating light 20 and/or the return light 24. It is possible to use the calibration reference 16 in this way, because the calibration reference has known effects on light that interacts with its receiving surface 32. The known optical properties of the calibration reference 16 may include a pattern of diffuse reflection independent of elevation and azimuthal angle of the incident light.

As described above, the calibration reference 16 alters illuminating light 20 incident on the receiving surface 32 to produce returning light 24 having known optical properties. These known optical properties of the returning light 24 are determined by the optical metamaterial 30. Because the optical properties of the calibration reference 16 are known, a calibration function (also referred to as a transform) may be determined that compensates for the effects of the measurement system on the output signal 42.

The metamaterial 30 may be made from sub-wavelength structures that allow for the control of wave physics. This control may be in the form of changing the wave direction (refraction, typically with the real part of a material parameter) or in attenuation (absorption, typically with the imaginary part of a material parameter).

The metamaterials 30 are made from assemblies of multiple sub-wavelength (e.g. $\lambda/8$ to $\lambda/30$) elements fashioned from composite materials such as metals, dielectrics, and plastics. The materials may be arranged in repeating and non-repeated patterns at scales that are smaller than the wavelengths of the phenomena influenced by the metamaterial. The properties of the metamaterials 30 are not determined from the properties of the base materials, but from the structures of the metamaterials with effective properties at a larger scale (typically macro-scale level). By controlling the shape, geometry, size, orientation and placement of the metamaterial 30, acoustic, electromagnetic, or other type of waves may be controlled. This control is accomplished by blocking, absorbing, enhancing, or bending waves that achieve characteristics not normally possible with conventional materials.

Figure 6:
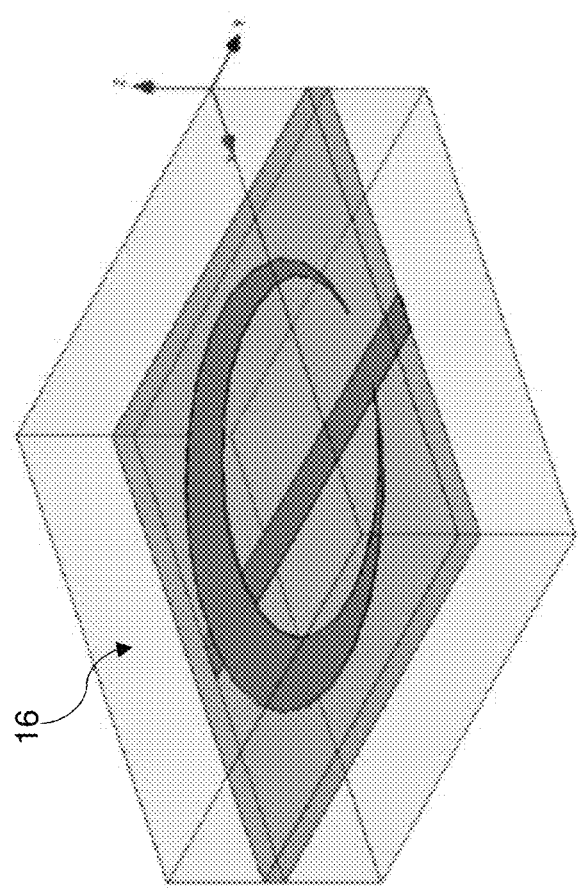
FIG. 6 is a schematic diagram of a one embodiment of a calibration reference.

Advanced metamaterial physics that can be applied to novel calibration references 16 (also referred to as coupons) provide improved infrared (IR) management. Different parts of the electromagnetic (EM) spectrum may be tailored to control properties of light after interacting with the calibration reference 16 when utilizing metamaterial physics and material combinations. For example, two technologies allow for surfaces to have improved IR management capabilities: the crescent ring resonator shown in FIG. 6 and hyperbolic metamaterials.

A hyperbolic metamaterial (HMM) medium refers to an artificial medium with subwavelength features whose isofrequency surface is a hyperboloid. This type of metamaterial (also called indefinite medium) has a diagonal form of the permittivity tensor (i.e. $\varepsilon_{xx}$, $\varepsilon_{yy}$, $\varepsilon_{zz}$) whose diagonal elements have different signs (e.g. $\varepsilon_{xx}=\varepsilon_{yy}<0$, $\varepsilon_{zz}>0$), leading to the hyperbolic iso-frequency surface. This feature corresponds to highly anisotropic electromagnetic properties (e.g., dielectric in one direction and metallic in other directions). The physical mechanism of this ultrabroadband absorption (and emission) is attributed to slow light modes confined in HMM waveguide structures, leading to the enhanced interaction and strong absorption of the light. As the incident light is coupled into the HMM waveguide taper, the group velocity ($v_g$) of the waveguide mode at different wavelength can be reduced significantly at their corresponding critical widths, leading to a so-called "rainbow" trapping effect in the vertical direction. Mode conversion occurs between the forward-waveguide-mode (i.e., forward mode whose power flow is parallel to its propagation direction) and the backward-waveguide-mode near the critical width (i.e., backward mode whose power flow is anti-parallel to its propagation direction). In a HMM waveguide array, the waveguide modes in adjacent units interact with each other due to overlapping evanescent fields; allowing the EM field in the periodic structure to be described by Bloch mode analysis.

As described above, the HMM structures may have a highly efficient (compared to traditional techniques) rainbow trapping effect for electromagnetic energy. HMM designs may be amenable to large area fabrication technologies and may enable applications based on efficient rainbow trapping of normal and oblique incident electromagnetic energy. Because an HMM may be used as an artificial medium with subwavelength features having an iso-frequency surface that is a hyperboloid, the HMM structures allow for the density of states to go from a confined "normal" material (e.g. isotropic or anisotropic regular materials) to an unconfined "hyperbolic" material where the density of states can be orders of magnitude larger (e.g., allowing for more electromagnetic energy to be coupled into a given structure).

Adiabatic metallic metamaterials or plasmonic structures typically do not permit the complete "stopping" of light waves in the presence of degeneracy points even under the assumption of lossless materials due to the fundamental nonadiabaticity near the degeneracy point. A complete stop of light may also not be achievable in the lossless HMM waveguide tapers either, although the group velocity at the degeneracy point may be zero in principle. For example, the incident forward mode may convert to backward mode and escape from the "trapped" position (albeit at a possibly much lower energy).

Wide-angle polarization insensitive ultra-thin electronic materials may use metamaterials or other Frequency Selective Surface (FSS) structures. Typically Wide-angle polarization insensitive ultra-thin electronic materials require two different orientation unit cells to achieve the polarization insensitive absorption or a multiplanar structure to yield multi-band performance yet results in big or thick unit cells on typical dielectrics. Surface current analysis can be used to gain insight into the multiple resonant modes of the different peaks, and the resonant behavior can be described by using the equivalent inductance (L) and equivalent capacitance (C) of a structure.

Typical scattering unit cells are used at normal angles of incidence and do not take into account the variation of the wavelength response at oblique angles of incidence. To make the wavelength response polarization insensitive at normal incidence, symmetrical array elements may be used (e.g. crosses, square patches, etc.). However, for oblique angle of incidences (AOIs), symmetrical array elements may not be used at oblique AOIs, because the wavelength response shifts in frequency and becomes polarization dependent. To compensate for potential angle and frequency issues (as well as increase bandwidths), high permittivity dielectric layers may be used in conjunction with metamaterial unit cells. Finite element modeling may be used to model metamaterial structures over large bandwidths for different AOIs and polarization. Scan and wavelength compensations may necessitate dielectric layers with higher permittivity and, when dielectric layers are used, materials with fewer layers may offer better bandwidths.

In multilayered photonic materials, the broadband matching of the structure to free space may be done not just for normal incidence, but also for oblique incidence. The whole structure may be used to take care of the wavelength and scan compensations and if a layer must have a certain value of permittivity or thickness, the values of other layers may be adjusted to compensate for the deteriorations introduced by the previous perturbation. The metamaterial unit cell may need to be considered due to band-stop resonating issues.

Square patches may include low-pass elements to help minimize harmonics and anti-resonance problems. The square patch elements may be used for synthesizing low-pass elements that are capacitive to limit issues with resonating structures and can be modeled accurately for a wide range of AOIs at both polarizations by considering an equivalent model. Another alternative uses resonating metamaterial elements; but, if resonating metamaterial elements are used, the bandwidth may be limited. However, if non-resonant elements are used, the advantages of both metamaterials and capacitive topologies may be realized.

This approach to optical calibration reference 16 construction using metamaterials 30 is advantageous compared to previous efforts due to two properties: (1) the multi-polarization photonic diffuse scattering performance of an engineered metamaterial structure/metasurface pattern calibration reference combined with (2) a measurement system across multi-spectral photonic bands that can obtain the full $2\pi$ BRDF in one capture. Although dielectric layers play an important part in the performance of the structure when oblique AOIs are considered, the relative magnetic permeability may add additional performance metrics. Typically when surface currents on two (or more) metallic layers are moving in opposite directions, a magnetic flux coupling is realized with the incident H-field component (in the transverse plane). By adjusting the thickness and substrate material properties in terms of geometry and permittivity properties, novel scattering behavior may be realized.

Figure 2:
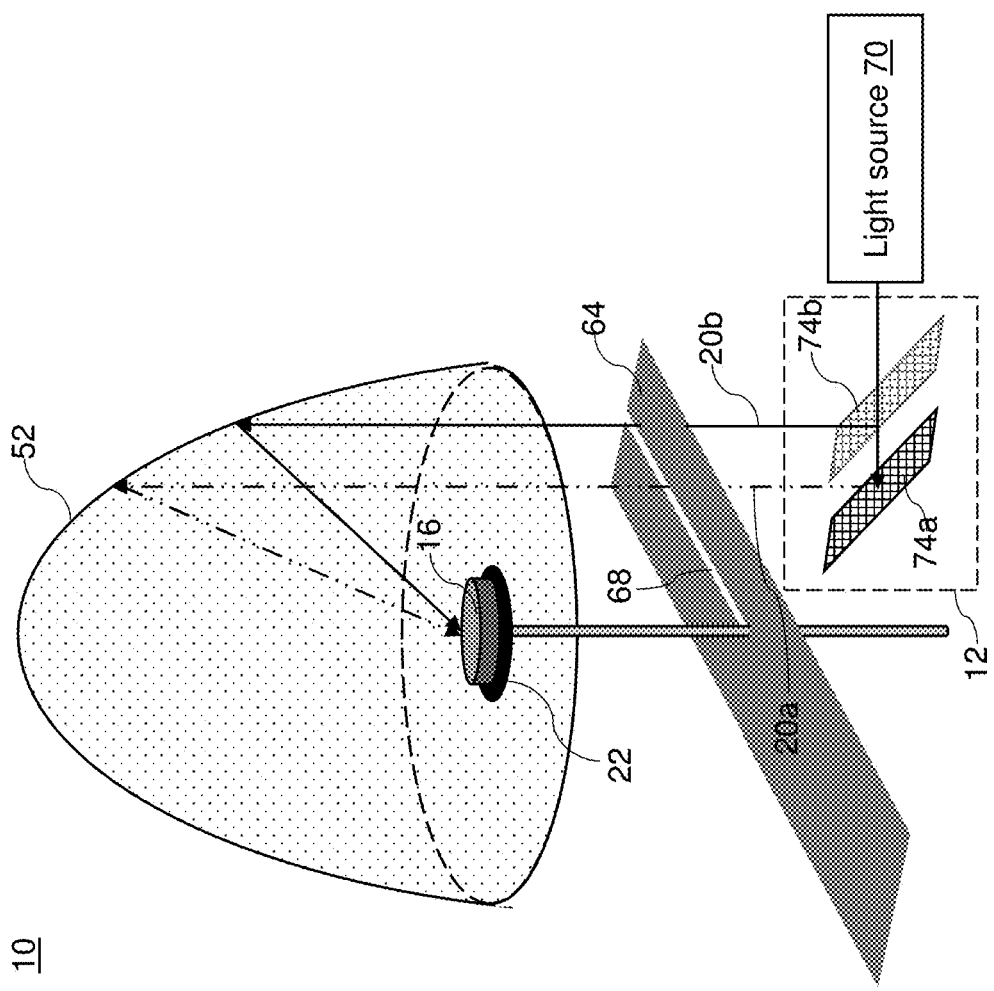
FIG. 2 shows a schematic diagram of an exemplary measurement system including a scanning mirror.

In the embodiment depicted in FIG. 2, the measurement system 10 includes circuitry 40 that receives an output signal 42 from the detection system 14 based on the detected returning light (also referred to as detected illumination) 60. When the detected returning light is from the calibration reference 16, the circuitry 40 determines a calibration function based on the output signal 42 and the known optical properties of the calibration reference 16.

The calibration function may be determined using any suitable signal processing technique including machine learning, optical modeling, Fourier analysis, wavelet processing, etc. Determining the calibration function may be performed using the circuitry 40 or another computer system. In either case, the circuitry 40 may store the necessary transform(s) for the measuring system 10 in a non-transitory computer readable medium.

The circuitry 40 may have various implementations. For example, the circuitry 40 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 40 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 40. The circuitry 40 may be communicatively coupled to the computer readable medium and network interface through a system bus, motherboard, or using any other suitable structure known in the art.

As described above, the measurement system 10 uses the calibration function to measure optical properties of samples placed at the imaging location 22 by calibrating the output signal 42 to remove/reduce the effects of the measurement system 10 on the output signal 42. That is, in the same manner that the calibration reference 16 is imaged using the illuminating light 20, a sample 17 placed at the imaging location 22 is similarly illuminated with the illuminating light 20 and returning light 24 from the imaging location 22 is detected by the detection system 14. For example, turning to the embodiment shown in FIG. 3, the sample 17 is positioned at the imaging location 22 so that the illuminating light 20 interacts with the sample 17 to produce the returning light 24 that is detected by the detection system 14 and output as the output signal 42. The calibration function for the measurement system 10 is then applied to the output signal 42 from the detection system 14 to produce the calibrated sample light signal (e.g., a BRDF of the sample).

In FIG. 1 (as well as in FIGS. 2 and 4), the reflecting surface 52 is shown partially transparent so that the imaging location 22 is visible. In the embodiment shown in FIGS. 3 and 5, the measurement system 10 a schematic diagram of the measurement system 10 is shown with a more detailed view of the detecting system 14 and the illuminating optical system 12. In the depicted embodiments, the measurement system 10 is capable of measuring full $2\pi$ spatial Bi-Reflection sample optical characteristics.

In the embodiment depicted in FIG. 1, the detection system 14 includes an output optical system 62 having a mirror 64 configured to generate further altered returning light 66 by altering a trajectory of the altered returning light 54, such that the further altered returning light 66 is detected by the imager 50. The illuminating light 20 passes through an opening 68 in the mirror 64 before being redirected by the reflecting surface 52 to illuminate the imaging location 22. Since the reflected energy from the surface of 52 may be hitting the reflected surface 64 with a small slot 68, there may be some missing information/energy being intercepted by the imager 50. Computer software may allow the "stitching" of the reflected image off of mirror 64 to the imager to interpolate across that gap in the measured image (e.g., for each imager of an array of imagers).

Figure 3:
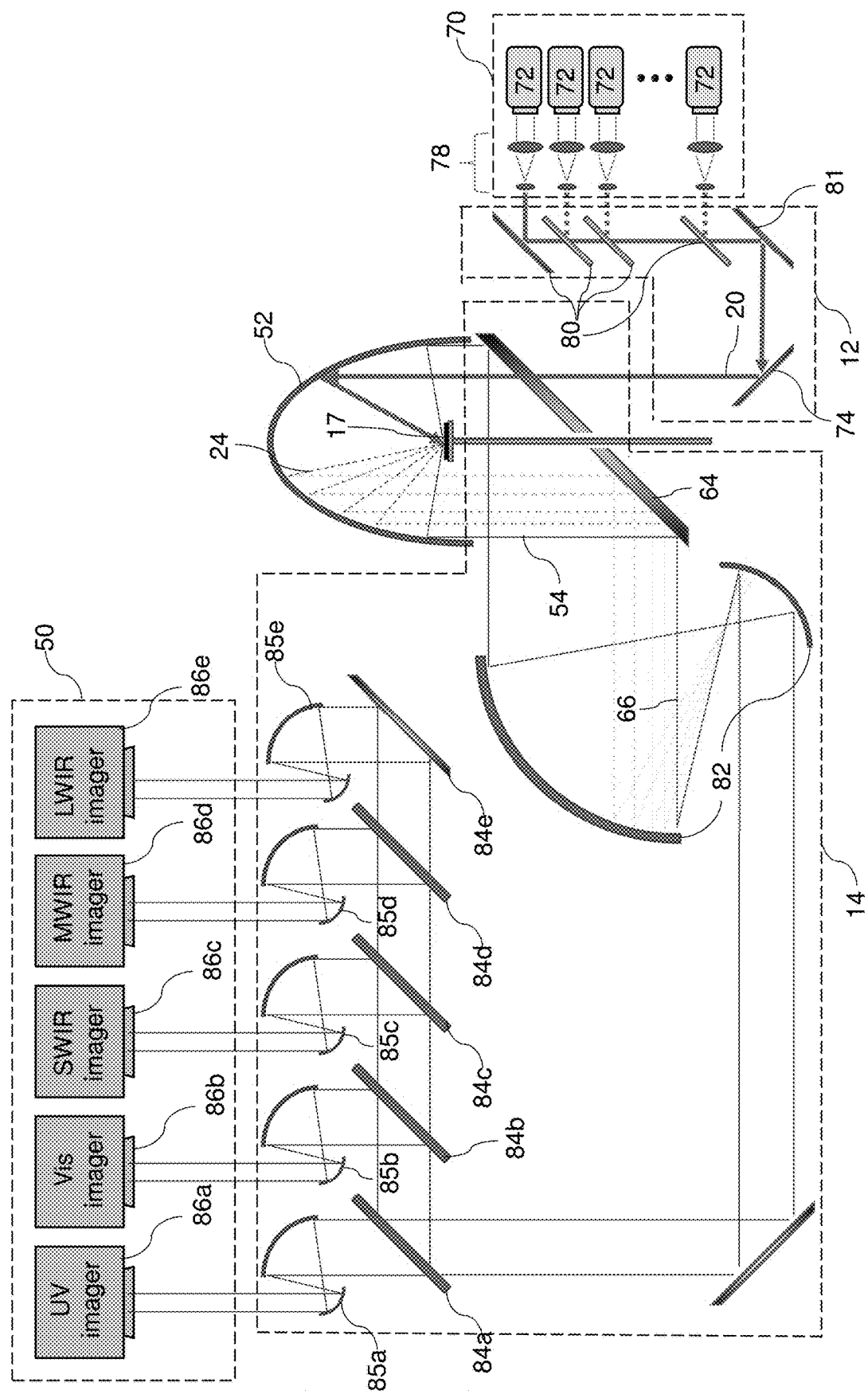
FIG. 3 is a schematic diagram of an exemplary measurement system including a light source and an imager (2D image gathering device).

In the embodiment depicted in FIG. 3, the measurement system 10 includes a light source 70 that generates the illuminating light 20. The light source 70 may be tunable to output a wavelength of light in a wavelength range including and spanning across ultraviolet (UV) and long wave infrared (LWIR). In one embodiment, the light source 70 includes a plurality of light emitters 72 that each emit a different wavelength of light. For example, the light source 70 may be a series of light emitters (e.g., coherent or incoherent) that traverse from the UV all the way to the LWIR wavebands.

The light source 70 may be any suitable source of light, such as light emitting diode (LED), organic LED (OLED), incandescent, laser, etc. The light source 70 may generate the illuminating light 20 as a continuous signal or a pulsed signal that varies with time. For example, the light source 70 may emit the illuminating light 20 as pulsed light having a frequency of 10 Hz to 1 kHz.

A broad wavelength emission range may be needed for calibration references 16 that undergo nonlinear effects under illumination due to their engineered properties. For example, one may illuminate a coupon with 0.5 microns blue light, but through nonlinear optics generate two one-micron photons for every 0.5 micron photon. There are other nonlinear effects such as four wave mixing that may also be of interest for spectral reflectance properties. In addition, the calibration references may be designed with subwavelength structures and patterns for novel spatial reflectance properties as well (i.e. incoming illumination provides extremely anisotropic responses out of plane whereby the primary spectral lobe is not radiating along the same direction in the original incidence plane but rather radiating its primary spectral lobe in a plane that is of a different orientation relative to the first).

To determine a calibration function that spans across a wavelength range, multiple calibration references may be used where each calibration references is used for a particular wavelength range of illuminating light 20. That is, the calibration reference 16 may include a plurality of wavelength specific calibration references and each of the calibration references may be associated with a particular wavelength of incident light.

In the embodiment shown in FIG. 2, the illuminating optical system 12 includes a scanning optical element 74 that alters a location on the reflecting surface 52 that the illuminating light 20 interacts with (e.g., is reflected by) the reflecting surface 52. In FIG. 2, the scanning optical element 74 is a movable mirror that is shown at a first position 74a (which directs illuminating light 20a towards the reflecting surface 52) and a second position 74b (which directs illuminating light 20b towards a different location on the reflecting surface 52).

After the light is generated by the light source 70, it may pass through a series of optical telescopes 78 (e.g., made up of reflective or refractive elements) before reaching redirecting mirrors 80, 74, 81. As described above, the illuminating light 20 passes through an opening 68 of the mirror 64 (also referred to as the primary mirror). As described previously, the reflecting surface 52 collects the returning light 24 from the imaging location 22 and collimates the photons down to the primary mirror 64.

The returning light 54 is reflected by the primary mirror 64 as altered returning light 66, which may be then sent to a reflecting telescoping system 85a-85e to reduce the beam diameter of the altered returning light 66 in terms of transverse beam control. Reflective optics may be used in the measurement system 10 instead of refractive optics because: (1) dispersion issues within a solid refractive material are minimized because the photons' redirection is due to a reflection occurring primarily at the surface of a metal like coating, and (2) the coating used (e.g. Ag, Au, etc.) may be somewhat broad band across the wavebands of interest.

In the depicted embodiment, the imager 50 includes a plurality of light sensors 86a-86e. Each of the light sensors 86 may be sensitive to light of different wavelengths. For example, the returning light may be passed through a series of reflective or refractive beam splitters 84a-84e for passing the returning light to different light sensors 86 by splitting the returning light into different parts of the electromagnetic spectrum from UV to LWIR. As shown, another telescope 82 may be used to further reduce the beam size.

Figure 4:
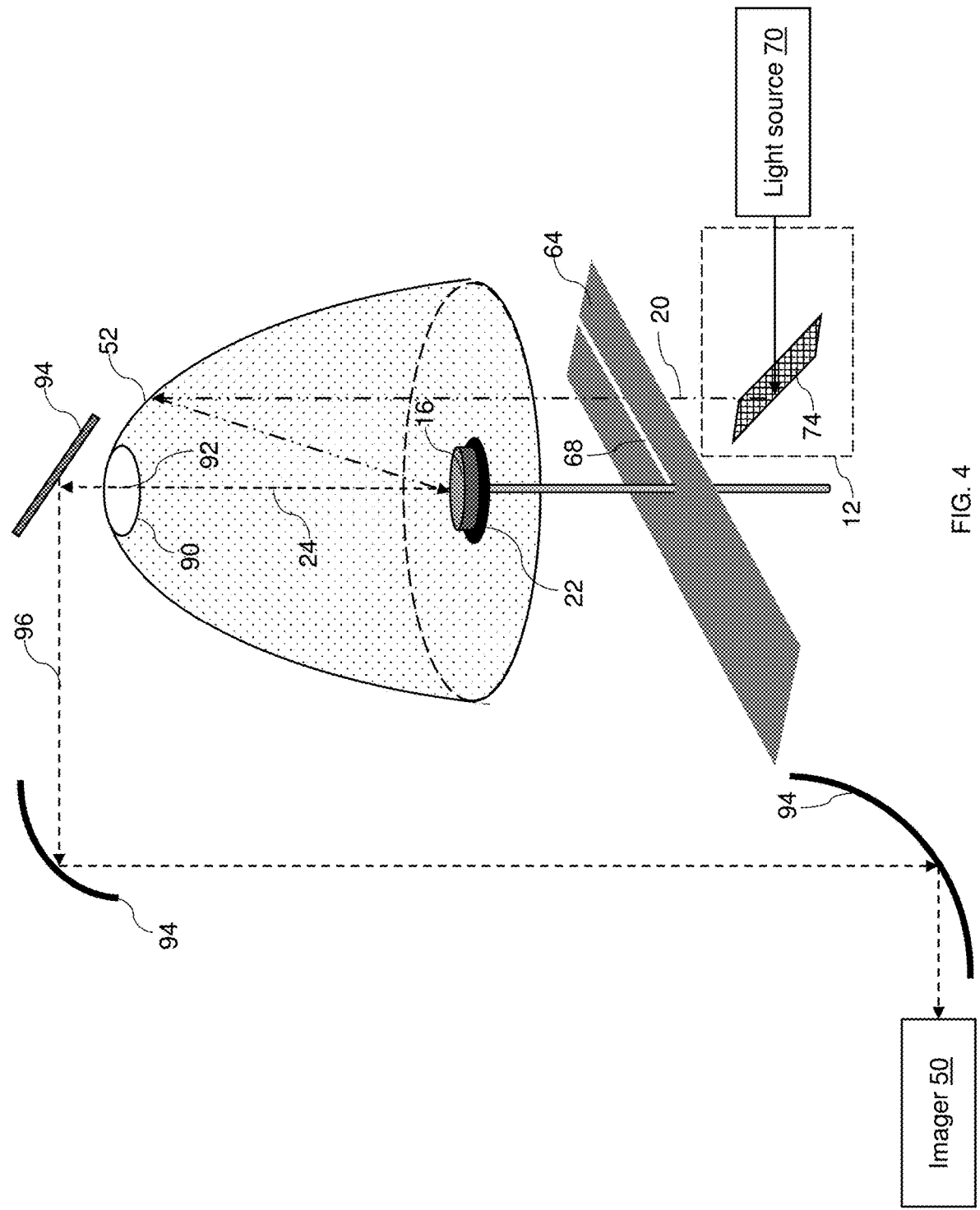
FIG. 4 is a schematic diagram of an exemplary measurement system including an apex optical system.
Figure 5:
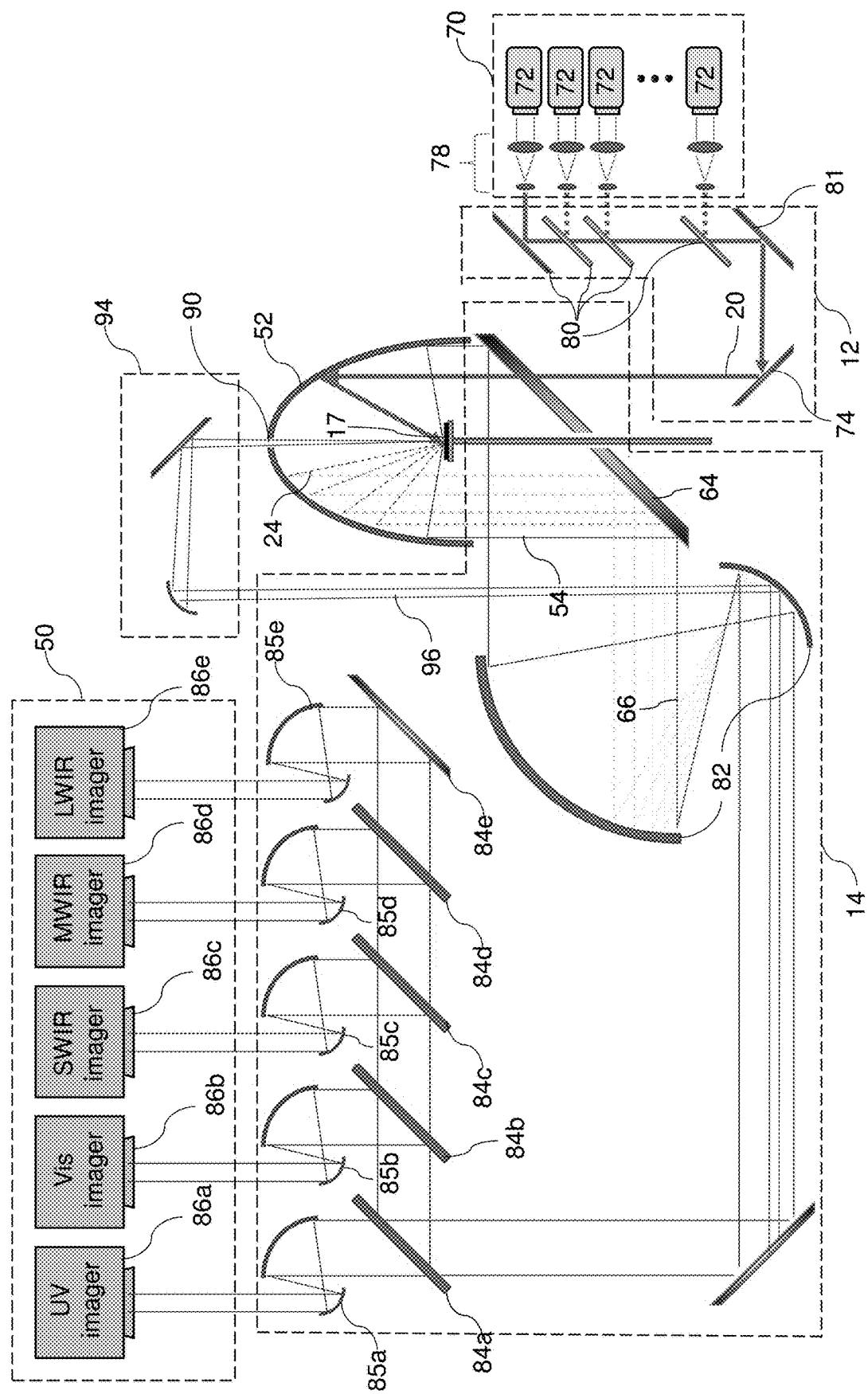
FIG. 5 is a schematic diagram of an exemplary measurement system including a light source, a series of photo imagers to detect electromagnetic radiation in multiple photonic bands, and an apex optical system.

In the embodiment depicted in FIGS. 4 and 5, the parabolic shape of the receiving surface 52 has an opening 90 located directly above the imaging location 22 at an apex 92 of the reflecting surface 52. The output optical system 62 includes an apex optical system 94 configured to generate modified returning light 96 by altering the trajectory of the returning light 24 passing through the opening 90, such that the modified returning light 96 is detected by the imager 50.

As described, samples having known photonic properties may be used to calibrate the system 10 to determine a calibration function (also referred to as a transform) for modeling an effect of the measurement system on returning light from a sample. For example, the sample 17 (also referred to as a coupon) may be designed with subwavelength structures and patterns for novel spatial reflectance properties (i.e. incoming sound provides extremely anisotropic responses out of plane whereby the primary spectral lobe is not radiating along the same direction in the original incidence plane but rather radiating its primary spectral lobe in a plane that is of a different orientation relative to the first), such that a single sample 17 and/or spatial source may be used to calibrate the system 10.

Figure 7:
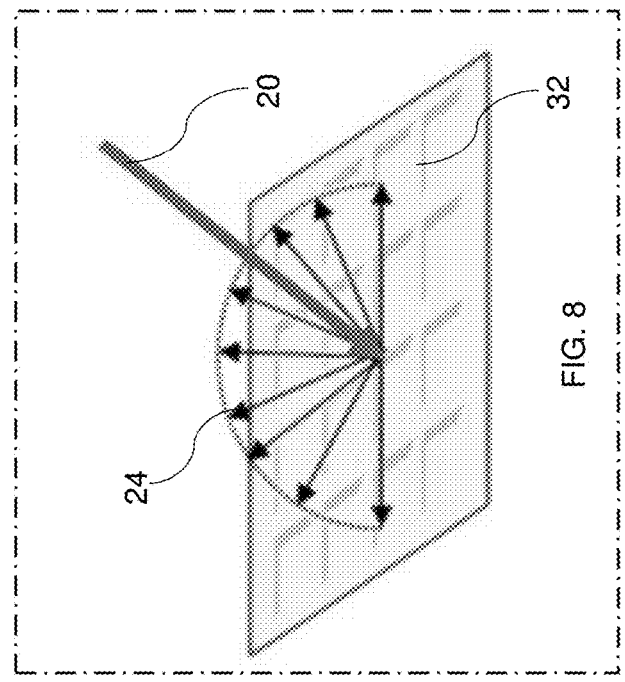
FIG. 7 depicts Lambertian surface reflectance.
Figure 8:
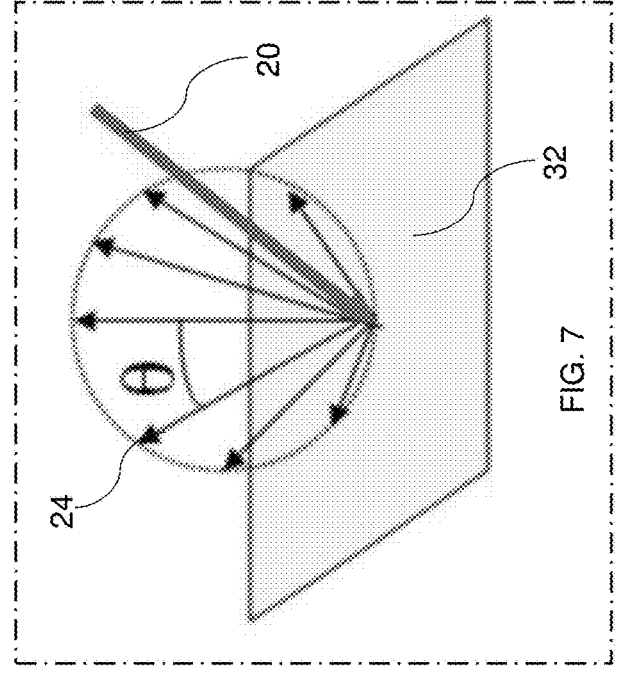
FIG. 8 depicts super Lambertian surface reflectance.

Exemplary samples 17 include flat gold or silver materials having broadband and highly reflective specular components throughout the visible and infrared range. However, diffuse-like reflective samples (such as Infragold at long wave IR) are not necessarily the best candidate for extremely diffuse scattering reference samples. For example, a sample may be selected that can reflect diffusely in a Lambertian like pattern evenly across all elevation and azimuthal angle cases for calibration, regardless of incident angle of the incoming radiation as shown in FIGS. 7 and 8. Metamaterials (as described above) may have such properties if designed properly.

In addition, metasurfaces, which are sub-wavelength structured surfaces, may also allow for the engineering of specific reflection response properties. However, one pattern may not necessarily cover the entire photonics regime from long wave infrared (LWIR) to ultraviolet (UV). Instead, multiple samples may be needed at different regimes (with overlap) to provide diffuse-like reflectance reference for use across such a large range.

Although there exists different type of reflectance systems, an under-filled sample (also referred to as a coupon) is typically used for BRDF measurements. Under-filling is defined as the irradiation that, when it is intercepted by the sample surface, has a vast majority of its energy inside the physical sample bounds. Typically this is a circular or elliptical beam that has a full beam $1/e^2$ transverse beam profile width that is approximately one-third of the physical distance across the dimension of the sample. This is needed so that a majority of the encircled energy is captured by the coupon for the BRDF measurement. Traditionally these light sources have been used with black body sources and spectral filters. Although light sources may be spectrally broad and continuous, their output radiance may not be enough to induce nonlinear effects in certain samples. More modern light sources (such as lasers) may allow for not only irradiating the surface with a higher flux of photons in a much more targeted manner, but also for novel nonlinear material effects.

Figure 9:
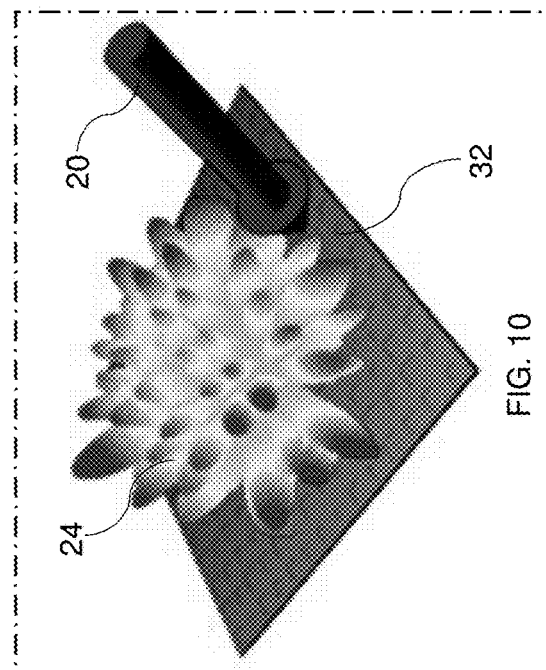
FIG. 9 is an exemplary bidirectional reflectance distribution function (BRDF) of a flat plate having typical specular lobe and weakly diffused side lobe components.
Figure 10:
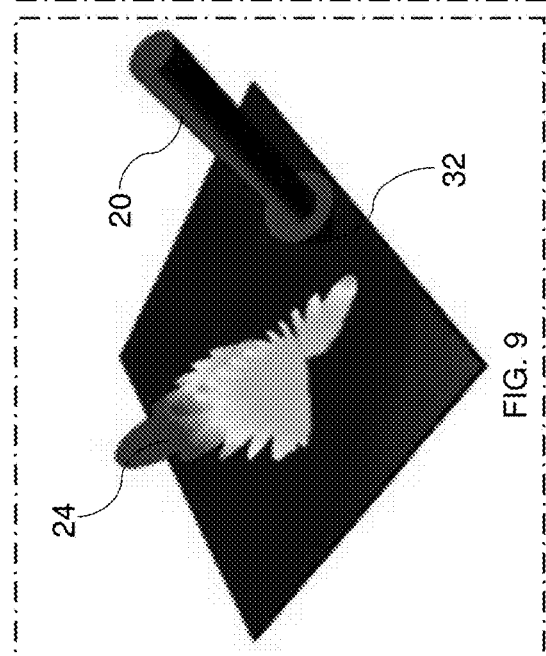
FIG. 10 is an exemplary bidirectional reflectance distribution function (BRDF) of an engineered metamaterial/metasurface that induces preferential omnidirectional scattering via subwavelength structured elements.

Most flat surfaces will have a specular and diffuse component of its reflection after interacting with the surface to some degree. However, when a calibration reference is fabricated with the proper unit cell design, scattering may be controlled preferentially in a $2\pi$ steradian angle. This may be accomplished with full wave electromagnetic solvers coupled with optimization techniques as shown in FIGS. 9 and 10. This is a type of forced/engineered scattering; however, many photonically advanced metasurfaces and metamaterials may be utilized as a calibration sample to preferentially redirect photonic (e.g. UV, Vis, NIR, SWIR, MWIR, LWIR, etc.) scattering.

Figure 11:
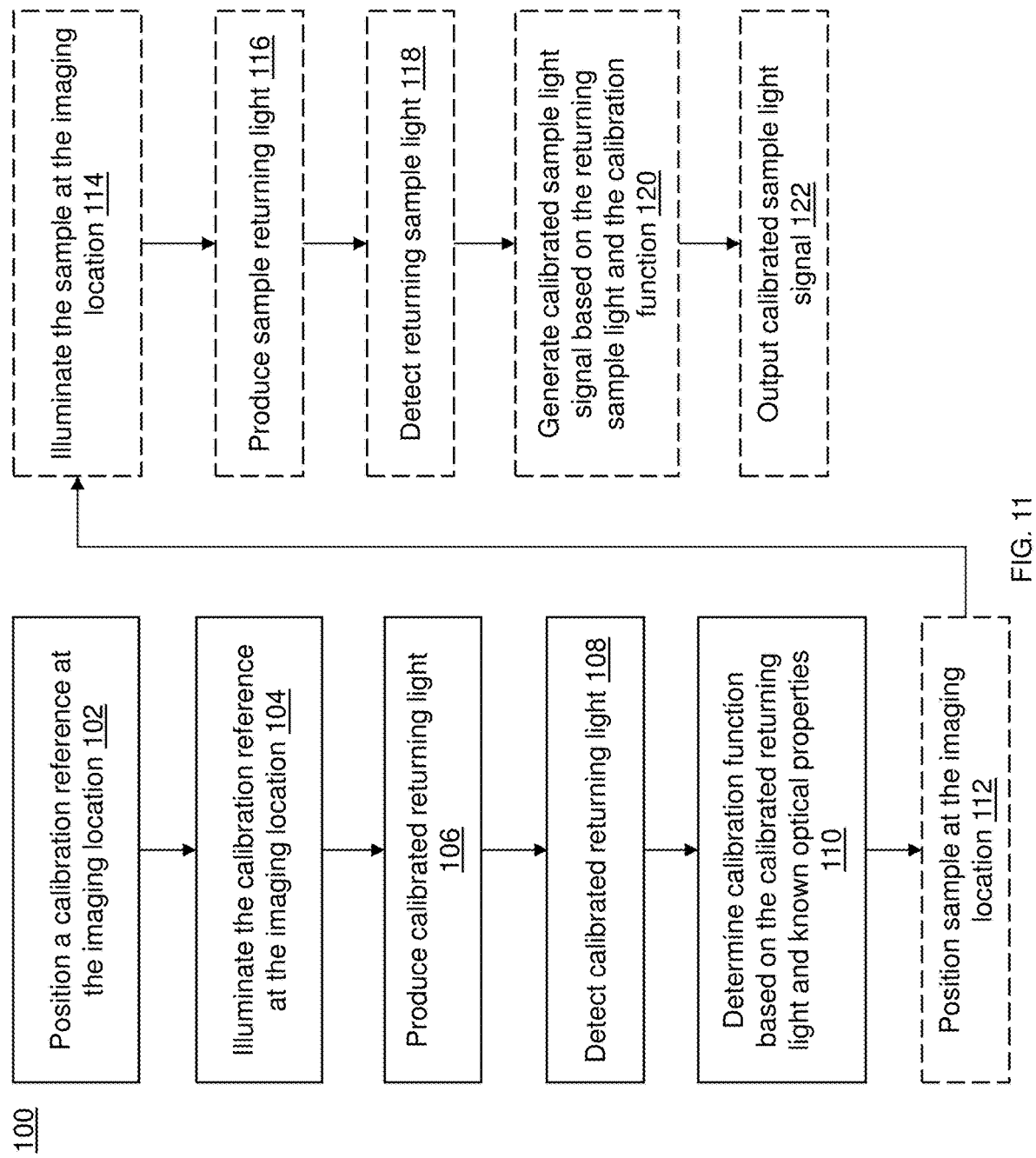
FIG. 11 is a flow diagram depicting a method for measuring bidirectional reflectance distribution function (BRDF) in a photonic regime.

Turning to FIG. 11, an embodiment of a method 100 for measuring bidirectional reflectance distribution function (BRDF) in a photonic regime is shown. In processing block 102, a calibration reference 16 (FIG. 1) is positioned at the imaging location 22 (FIG. 1) of a reflecting surface 52 (FIG. 1). In processing block 104, the calibration reference 16 is illuminated at the imaging location 22 with illuminating light 20 (FIG. 1). In processing block 106, the illuminating light 20 incident on the receiving surface 32 (FIG. 1) is altered using the calibration reference 16 to produce calibrated returning light 24 (FIG. 1) having known optical properties. In processing block 106, the calibrated returning light 24 is detected with a detection system 14 (FIG. 1). In processing block 108, a calibration function is determined based on the calibrated returning light 24 and the known optical properties.

In optional process block 112, a sample 17 (FIG. 3) is positioned at the imaging location 22 (FIG. 1). In optional process block 114, the sample 17 is illuminated with the illuminating light 20 (FIG. 1). In optional process block 116, the illuminating light 20 incident on the sample 17 is altered using the sample 17 to produce sample returning light 24 (FIG. 1). In process block 118, the returning sample light 24 is detected with the detection system 14 (FIG. 1) and output as a detection signal 42 (FIG. 1). In optional process block 120, a calibrated sample light signal is generated by applying the calibration function to the detection signal 42. In optional process block 122, the calibrated sample light is output as a BRDF of the sample.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A measurement system comprising:
   an illuminating optical system configured to direct illuminating light to an imaging location;
   a detector configured to detect returning light from the imaging location; and
   a calibration reference including an optical metamaterial having a receiving surface, wherein the calibration reference is configured to be placed at the imaging location and to alter illuminating light incident on the receiving surface to produce returning light having known optical properties;
   wherein the detector includes an imager and a reflecting surface having a parabolic shape encircling the imaging location, the reflecting surface positioned to generate altered returning light by altering a trajectory of the returning light, such that the altered returning light exits at a base of the reflecting surface and is detected by the imager.

2. The measurement system of claim 1, further comprising circuitry configured to:
   receive an output signal from the detector based on the detected returning light; and
   determine a calibration function based on the output signal and the known optical properties.

3. The measurement system of claim 1:
   wherein the detector includes an output optical system having a mirror configured to generate further altered returning light by altering a trajectory of the altered returning light, such that the further altered returning light is detected by the imager; and
   wherein the illuminating light passes through an opening in the mirror before being redirected by the reflecting surface to illuminate the imaging location.

4. The measurement system of claim 1:
- wherein the parabolic shape of the receiving surface has an opening located directly above the imaging location at an apex of the reflecting surface; and
- wherein the output optical system includes an apex optical system configured to generate modified returning light by altering the trajectory of the returning light passing through the opening, such that the modified returning light is detected by the imager.

5. The measurement system of claim 1, further including a light source configured to generate the illuminating light.

6. The measurement system of claim 1, wherein the known optical properties include a pattern of diffuse reflection independent of elevation and azimuthal angle of the incident light.

7. A measurement system comprising:
- an illuminating optical system configured to direct illuminating light to an imaging location; and
- a detector configured to detect returning light from the imaging location, the detector including:
- a reflecting surface having a parabolic shape encircling the imaging location and positioned to generate altered returning light by altering a trajectory of the returning light, such that the altered returning light exits at a base of the reflecting surface and is detected by an imager;
- wherein the parabolic shape has an opening located directly above the imaging location at an apex of the reflecting surface;
- an output optical system having a mirror configured to generate further altered returning light by altering a trajectory of the altered returning light, such that the further altered returning light is detected by the imager;
- wherein the illuminating light passes through an opening in the mirror before being redirected by the reflecting surface to illuminate the imaging location; and
- an apex optical system configured to generate modified returning light by altering the trajectory of the returning light passing through the opening, such that the modified returning light is detected by the imager.

8. The measurement system of claim 7, further comprising a calibration reference including an optical metamaterial having a receiving surface, wherein the calibration reference is configured to be placed at the imaging location and to alter illuminating light incident on the receiving surface to produce returning light having known optical properties.

9. The measurement system of claim 8, further comprising circuitry configured to:
- receive an output signal from the detector based on the detected returning light from the calibration reference; and
- determine a calibration function based on the output signal and the known optical properties.

10. The measurement system of claim 7, further including a light source configured to generate the illuminating light.

11. The measurement system of claim 7, wherein the known optical properties include a pattern of diffuse reflection independent of elevation and azimuthal angle of the incident light.

12. A method for measuring a bidirectional reflectance distribution function (BRDF), the method comprising:
- positioning a calibration reference including an optical metamaterial having a receiving surface at an imaging location of a reflecting surface;
- illuminating the calibration reference at the imaging location with illuminating light;
- altering the illuminating light incident on the receiving surface using the calibration reference to produce calibrated returning light having known optical properties;
- detecting the calibrated returning light with a detector;
- determining a calibration function based on the calibrated returning light and the known optical properties,
- positioning a sample at the imaging location;
- illuminating the sample at the imaging location with the illuminating light;
- altering the illuminating light incident on the sample using the sample to produce sample returning light;
- detecting the returning sample light with a detector and outputtinq a detection signal from the detector; and
- generating a calibrated sample light signal by applying the calibration function to the detection signal.

13. The method of claim 12:
- wherein the calibrated sample light signal is a BRDF of the sample; and
- further comprising outputting the BRDF of the sample.

14. The method of claim 12, wherein the detecting of the returning light with the detector includes generating altered returning light by altering a trajectory of the returning light using a reflective surface of the detector having a parabolic shape encircling the imaging location, such that the altered returning light exits at a base of the reflecting surface is detected by an imager of the detector.

15. The method of claim 14:
- wherein the detecting of the returning light with the detector further includes generating further altered returning light, using an output optical system of the detector having a mirror, by altering a trajectory of the altered returning light, such that the further altered returning light is detected by the imager; and
- wherein the illuminating of the imaging location includes passing the illumination light through an opening in the mirror before redirecting the illuminating light with the reflecting surface to illuminate the imaging location.

16. The method of claim 15, wherein the detecting of the returning light with the detector further includes generating modified returning light by altering the trajectory of the returning light passing through an opening in the parabolic shape of the receiving surface located directly above the imaging location at an apex of the reflecting surface, such that the modified returning light is detected by the imager.

17. The method of claim 12, wherein the illuminating of the imaging location includes generating the illuminating light with a light source.

18. The method of claim 12, wherein the known optical properties include a pattern of diffuse reflection independent of elevation and azimuthal angle of the incident light.

* * * * *